United States Patent
Lee et al.

(10) Patent No.: US 11,096,083 B2
(45) Date of Patent: *Aug. 17, 2021

(54) METHOD AND APPARATUS FOR PERFORMING BUFFER STATUS REPORTING PROCEDURE FOR RELAYING IN WIRELESS COMMUNICATION SYSTEM

(71) Applicant: LG ELECTRONICS INC., Seoul (KR)

(72) Inventors: Youngdae Lee, Seoul (KR); Sunghoon Jung, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/504,932

(22) Filed: Jul. 8, 2019

(65) Prior Publication Data

US 2019/0335356 A1  Oct. 31, 2019

Related U.S. Application Data

(63) Continuation of application No. 15/556,252, filed as application No. PCT/KR2016/003621 on Apr. 7, 2016, now Pat. No. 10,356,656.

(Continued)

(51) Int. Cl.
*H04W 28/02* (2009.01)
*H04W 88/04* (2009.01)
(Continued)

(52) U.S. Cl.
CPC ... *H04W 28/0278* (2013.01); *H04W 72/1284* (2013.01); *H04W 76/14* (2018.02);
(Continued)

(58) Field of Classification Search
None
See application file for complete search history.

(56) References Cited

U.S. PATENT DOCUMENTS

2010/0322144 A1* 12/2010 Lee .................. H04B 7/155
370/315
2011/0055387 A1  3/2011 Tseng et al.
(Continued)

FOREIGN PATENT DOCUMENTS

WO  WO 2013/191353 A1  12/2013
WO  WO 2014/014326 A1  1/2014
(Continued)

OTHER PUBLICATIONS

"3GPP TS 36.321 V12.5.0 (Mar. 2015): 3rd Generation Partnership Project; Technical Specification Group Radio Access Network: Evolved Universal Terrestrial Radio Access (E-UTRA); Medium Access Control (MAC) protocol specification (Release 12)", 3GPP Organizational Partners, 2015, 78 pages.
(Continued)

*Primary Examiner* — Jenkey Van
(74) *Attorney, Agent, or Firm* — Birch, Stewart, Kolasch & Birch, LLP

(57) ABSTRACT

A method for performing, by a relay user equipment (UE), a buffer status reporting (BSR) procedure in a wireless communication system is discussed. The method includes receiving data to be relayed from a remote UE via sidelink; trigger a BSR or a sidelink BSR for the data to be relayed; and transmit the BSR or the sidelink BSR to a network.

14 Claims, 18 Drawing Sheets

Related U.S. Application Data

(60) Provisional application No. 62/143,824, filed on Apr. 7, 2015.

(51) Int. Cl.
| | | |
|---|---|---|
| *H04W 72/12* | (2009.01) | |
| *H04W 76/14* | (2018.01) | |
| *H04W 84/04* | (2009.01) | |
| *H04W 72/04* | (2009.01) | |
| *H04W 72/10* | (2009.01) | |

(52) U.S. Cl.
CPC ........... *H04W 84/04* (2013.01); *H04W 88/04* (2013.01); *H04W 72/0406* (2013.01); *H04W 72/10* (2013.01)

(56) References Cited

U.S. PATENT DOCUMENTS

| | | | | |
|---|---|---|---|---|
| 2011/0261747 A1* | 10/2011 | Wang | ..................... | H04B 7/155 370/315 |
| 2011/0269393 A1* | 11/2011 | Ostergaard | ........ | H04W 72/1284 455/7 |
| 2012/0236782 A1* | 9/2012 | Bucknell | ........... | H04W 72/1221 370/315 |
| 2013/0322413 A1* | 12/2013 | Pelletier | ................ | H04L 5/0091 370/336 |
| 2015/0043365 A1 | 2/2015 | Park et al. | | |
| 2015/0172037 A1 | 6/2015 | Morita | | |
| 2015/0382324 A1 | 12/2015 | Sheng et al. | | |
| 2016/0044678 A1* | 2/2016 | Kwon | .................... | H04W 76/27 370/329 |
| 2016/0044707 A1* | 2/2016 | Folke | ................ | H04W 72/1284 370/329 |
| 2016/0044737 A1* | 2/2016 | Kwon | .................... | H04W 76/14 370/328 |
| 2016/0234754 A1* | 8/2016 | Baghel | ................ | H04W 72/048 |
| 2016/0338095 A1 | 11/2016 | Faurie et al. | | |
| 2017/0245292 A1 | 8/2017 | Agiwal et al. | | |
| 2017/0246245 A1 | 8/2017 | Kim et al. | | |
| 2017/0257876 A1* | 9/2017 | Loehr | ................... | H04L 5/0044 |
| 2018/0049260 A1* | 2/2018 | Aminaka | ............ | H04W 72/048 |

FOREIGN PATENT DOCUMENTS

| | | |
|---|---|---|
| WO | WO 2015/020356 A1 | 2/2015 |
| WO | WO 2015/047167 A1 | 4/2015 |

OTHER PUBLICATIONS

Baghel. "Relay Signaling between UE and Network", U.S. Appl. No. 62/114,503, filed Feb. 10, 2015 (Year: 2015).

Samsung Electronics Co., Ltd., "Method of Handling Priority for D2D Communication," Provisional Application No. 1757/CHE/2015, Apr. 1, 2015, India, 14 pages.

Stattin et al. Coordination between ProSe BSR and Cellular BSR, U.S. Appl. No. 62/035,091, filed Aug. 8, 2014. (Year: 2014).

* cited by examiner

FIG. 15

| Group index$_1$ | LCG ID$_1$ | Buffer Size$_1$ | Oct 1 |
| Buffer Size$_1$ | Group index$_2$ | | Oct 2 |
| LCG ID$_2$ | Buffer Size$_2$ | | Oct 3 |

⋮

| Group index$_{N-1}$ | LCG ID$_{N-1}$ | Buffer Size$_{N-1}$ | Oct 1.5*N-2 |
| Buffer Size$_{N-1}$ | Group index$_N$ | | Oct 1.5*N-1 |
| LCG ID$_N$ | Buffer Size$_N$ | | Oct 1.5*N |

FIG. 16

| Group index$_1$ | LCG ID$_1$ | Buffer Size$_1$ | Oct 1 |
| Buffer Size$_1$ | Group index$_2$ | | Oct 2 |
| LCG ID$_2$ | Buffer Size$_2$ | | Oct 3 |

⋮

| Group index$_N$ | LCG ID$_N$ | Buffer Size$_N$ | Oct 1.5*N-0.5 |
| Buffer Size$_N$ | R | R | R | R | Oct 1.5*N+0.5 |

METHOD AND APPARATUS FOR PERFORMING BUFFER STATUS REPORTING PROCEDURE FOR RELAYING IN WIRELESS COMMUNICATION SYSTEM

CROSS-REFERENCE TO RELATED APPLICATIONS

This Application is a Continuation of U.S. patent application Ser. No. 15/556,252 filed on Sep. 6, 2017 (now U.S. Pat. No. 10,356,656 issued on Jul. 16, 2019), which is the National Phase of PCT International Application No. PCT/KR2016/003621 filed on Apr. 7, 2016, which claims the priority benefit under 35 U.S.C. § 119(e) to U.S. Provisional Application No. 62/143,824 filed on Apr. 7, 2015, all of which are hereby expressly incorporated by reference into the present application.

BACKGROUND OF THE INVENTION

Field of the Invention

The present invention relates to wireless communications, and more particularly, to a method and apparatus for performing a buffer status reporting (BSR) procedure for relaying in a wireless communication system.

Discussion of the Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Recently, there has been a surge of interest in supporting proximity-based services (ProSe). Proximity is determined ("a user equipment (UE) is in proximity of another UE") when given proximity criteria are fulfilled. This new interest is motivated by several factors driven largely by social networking applications, and the crushing data demands on cellular spectrum, much of which is localized traffic, and the under-utilization of uplink frequency bands. 3GPP is targeting the availability of ProSe in LTE rel-12 to enable LTE become a competitive broadband communication technology for public safety networks, used by first responders. Due to the legacy issues and budget constraints, current public safety networks are still mainly based on obsolete 2G technologies while commercial networks are rapidly migrating to LTE. This evolution gap and the desire for enhanced services have led to global attempts to upgrade existing public safety networks. Compared to commercial networks, public safety networks have much more stringent service requirements (e.g., reliability and security) and also require direct communication, especially when cellular coverage fails or is not available. This essential direct mode feature is currently missing in LTE.

A buffer status reporting (BSR) procedure is used to provide the serving eNodeB (eNB) with information about the amount of data available for transmission in the uplink (UL) buffers of the UE. As ProSe is introduced in Rel-12, ProSe BSR may be newly defined.

By using concept of ProSe function, the extension of network coverage using L3-based UE-to-Network Relay and/or UE-to-UE Relay have been discussed. For UE-to-Network Relay and/or UE-to-UE Relay, how to use a BSR for data to be relayed may be required to be defined.

SUMMARY OF THE INVENTION

The present invention provides a method and apparatus for performing a buffer status reporting (BSR) procedure for relaying in a wireless communication system. The present invention provides a method and apparatus for using an uplink (UL) BSR or a sidelink (SL) BSR for user equipment (UE)-to-Network Relay or UE-to-UE Relay.

In an aspect, a method for performing, by a relay user equipment (UE), a buffer status reporting (BSR) procedure in a wireless communication system is provided. The method includes receiving data to be relayed from a remote UE via sidelink, trigger a BSR or a sidelink BSR for the data to be relayed, and transmit the BSR or the sidelink BSR to a network.

In another aspect, a relay user equipment (UE) in a wireless communication system is provided. The relay UE includes a memory, a transceiver, and a processor coupled to the memory and the transceiver. The processor is configured to control the transceiver to receive data to be relayed from a remote UE via sidelink, trigger a buffer status reporting (BSR) or a sidelink BSR for the data to be relayed, and control the transceiver to transmit the BSR or the sidelink BSR to a network.

UE-to-Network Relay or UE-to-UE Relay can be performed efficiently.

BRIEF DESCRIPTION OF THE DRAWINGS

FIG. 15 shows an example of SL BSR MAC CE for even N.

FIG. 16 shows an example of SL BSR MAC CE for odd N.

DETAILED DESCRIPTION OF THE EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
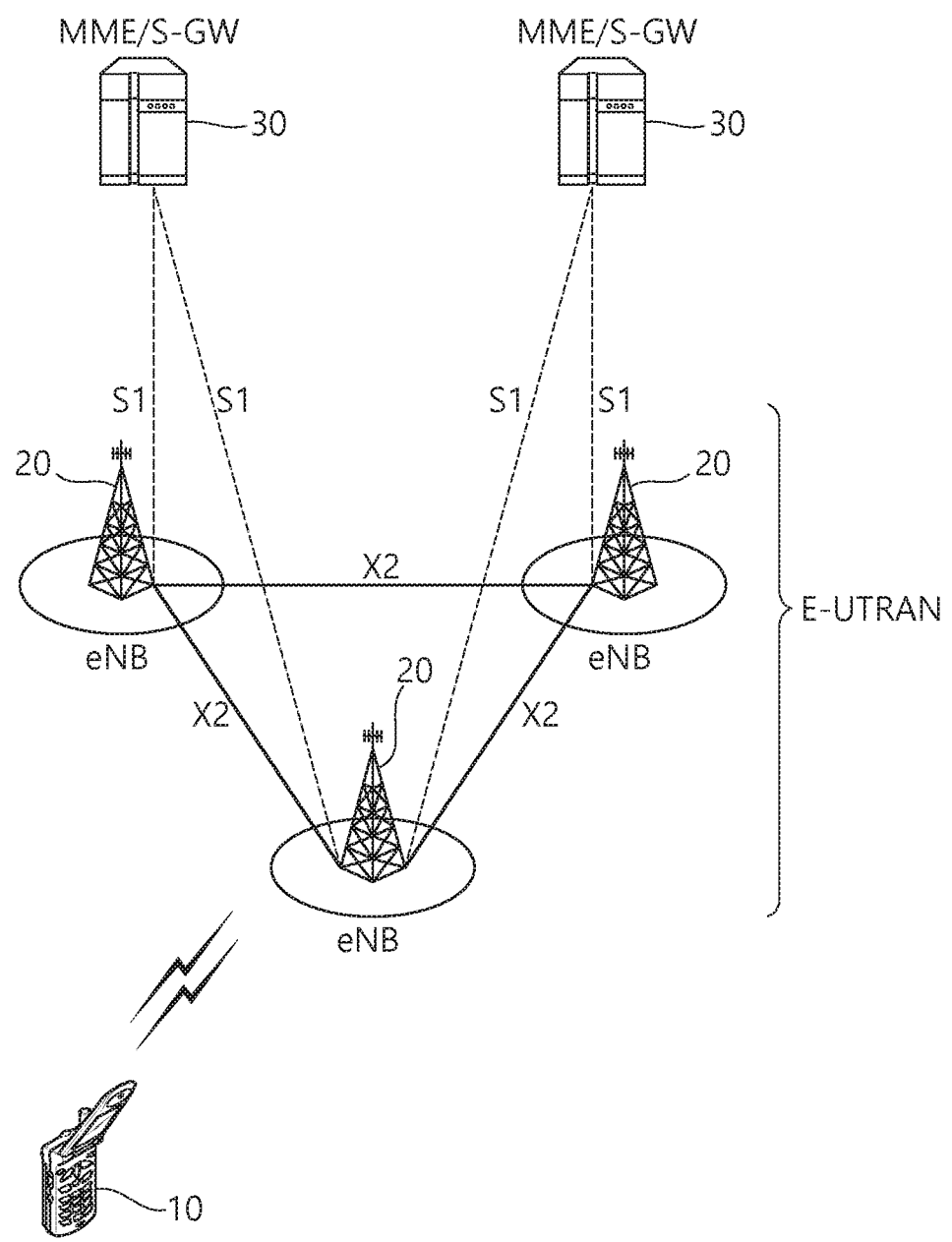
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
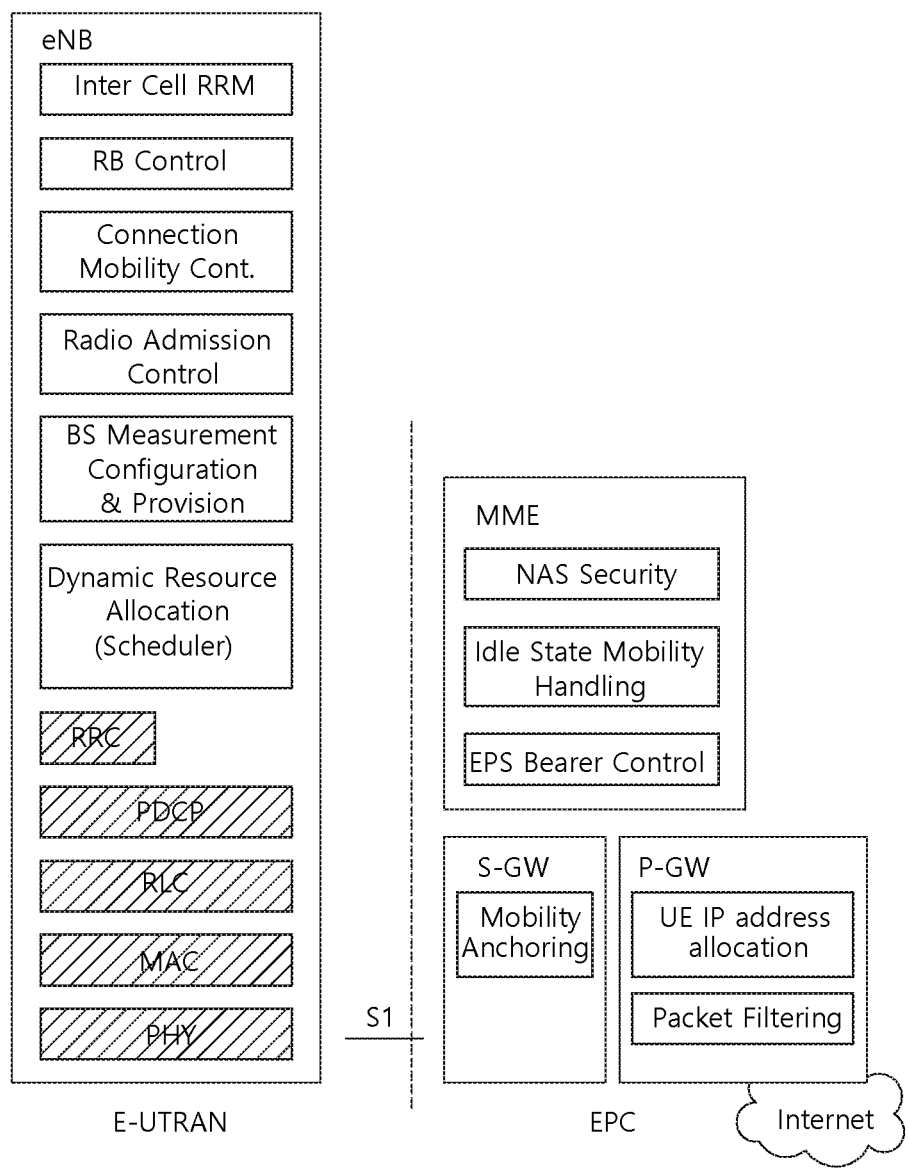
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
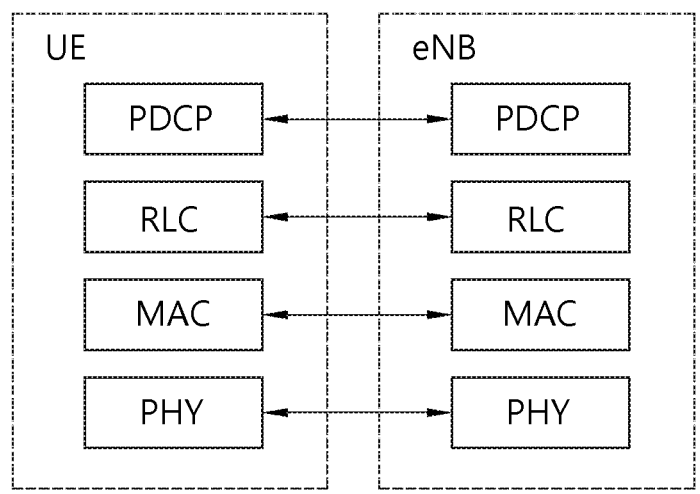
FIG. 3 shows a block diagram of a user plane protocol stack of an LTE system.
Figure 4:
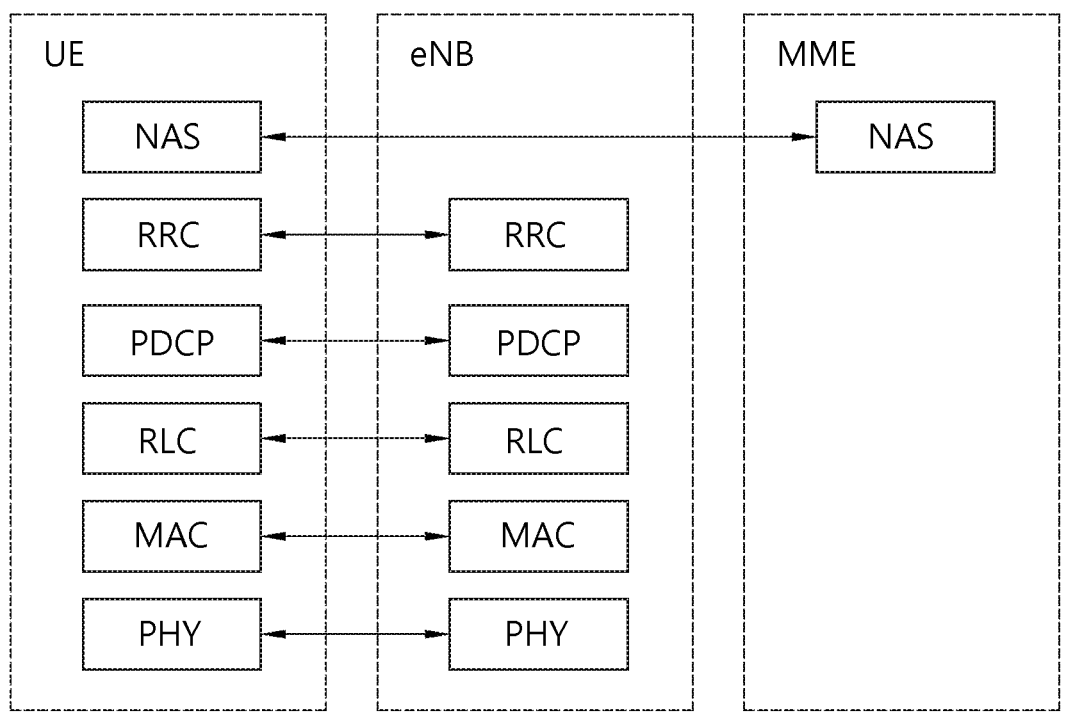
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
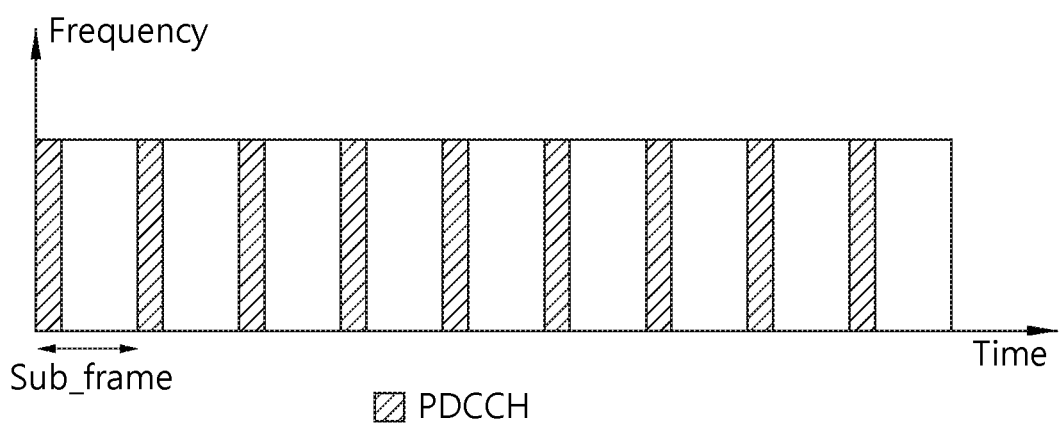
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle.

The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Proximity-based services (ProSe) are described. "ProSe" may be used mixed with "D2D." ProSe direct communication means a communication between two or more UEs in proximity that are ProSe-enabled, by means of user plane transmission using E-UTRA technology via a path not traversing any network node. ProSe-enabled UE means a UE that supports ProSe requirements and associated procedures. Unless explicitly stated otherwise, a ProSe-enabled UE refers both to a non-public safety UE and a public safety UE. ProSe-enabled public safety UE means a ProSe-enabled UE that also supports ProSe procedures and capabilities specific to public safety. ProSe-enabled non-public safety UE means a UE that supports ProSe procedures and but not capabilities specific to public safety. ProSe direct discovery means a procedure employed by a ProSe-enabled UE to discover other ProSe-enabled UEs in its vicinity by using only the capabilities of the two UEs with 3GPP LTE rel-12 technology. EPC-level ProSe discovery means a process by which the EPC determines the proximity of two ProSe-enabled UEs and informs them of their proximity. ProSe UE identity (ID) is a unique identity allocated by evolved packet system (EPS) which identifies the ProSe enabled UE. ProSe application ID is an identity identifying application related information for the ProSe enabled UE.

Sidelink (SL) is UE to UE interface for ProSe direct communication and ProSe direct discovery. Sidelink comprises ProSe direct discovery and ProSe direct communication between UEs. Sidelink uses UL resources and physical channel structure similar to UL transmissions. Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

For mapping between sidelink transport channels and sidelink physical channels, a sidelink discovery channel (SL-DCH) may be mapped to a physical sidelink discovery channel (PSDCH), which carries ProSe direct discovery message from the UE. The SL-DCH is characterized by:
  fixed size, pre-defined format periodic broadcast transmission;
    support for both UE autonomous resource selection and scheduled resource allocation by eNB;
    collision risk due to support of UE autonomous resource selection; no collision when UE is allocated dedicated resources by the eNB.

Further, a sidelink shared channel (SL-SCH) may be mapped to a physical sidelink shared channel (PSSCH), which carries data from a UE for ProSe direct communication. The SL-SCH is characterized by:
  support for broadcast transmission;
  support for both UE autonomous resource selection and scheduled resource allocation by eNB;
  collision risk due to support of UE autonomous resource selection; no collision when UE is allocated dedicated resources by the eNB;
  support for HARQ combining, but no support for HARQ feedback;
  support for dynamic link adaptation by varying the transmit power, modulation and coding.

Further, a sidelink broadcast channel (SL-BCH) may be mapped to a physical sidelink broadcast channel (PSBCH), which carries system and synchronization related information transmitted from the UE. The SL-BCH is characterized by pre-defined transport format.

A physical sidelink control channel (PSCCH) carries control from a UE for ProSe direct communication. The PSCCH is mapped to the sidelink control resources. The PSCCH indicates resource and other transmission parameters used by a UE for PSSCH.

For mapping between sidelink logical channels and sidelink transport channels for ProSe direct communication, a sidelink broadcast control channel (SBCCH) may be mapped to the SL-BCH. The SBCCH is a sidelink channel for broadcasting sidelink system information from one UE to other UE(s). This channel is used only by ProSe direct communication capable UEs. Further, a sidelink traffic channel (STCH) may be mapped to the SL-SCH. The STCH is a point-to-multipoint channel, for transfer of user information from one UE to other UEs. This channel is used only by ProSe direct communication capable UEs.

ProSe direct communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform ProSe direct communication.

In order to perform synchronization for out of coverage operation, UE(s) may act as a synchronization source by transmitting SBCCH and a synchronization signal. SBCCH carries the most essential system information needed to receive other ProSe channels and signals. SBCCH along with synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH. Otherwise, UE uses pre-configured parameters. System information block (SIB) 18 provides the resource information for synchronization signal and SBCCH transmission. There are two pre-configured subframes every 40 ms for out of coverage operation. UE receives synchronization signal and SBCCH in one subframe and transmit synchronization signal and SBCCH on another subframe if UE becomes synchronization source.

UE performs Prose direct communication on subframes defined over the duration of sidelink control (SC) period. The SC period is the period over which resources allocated in a cell for sidelink control and sidelink data transmissions occur. Within the SC period, the UE sends a sidelink control followed by sidelink data. Sidelink control indicates a layer 1 ID and characteristics of the transmissions (e.g. MCS, location of the resource(s) over the duration of SC period, timing alignment).

The UE performs transmission and reception of Uu and PC5 with the following decreasing priority order:
  Uu transmission/reception (highest priority)
  PC5 ProSe direct communication transmission/reception
  PC5 ProSe direct discovery transmission/reception (lowest priority)

Figure 6:
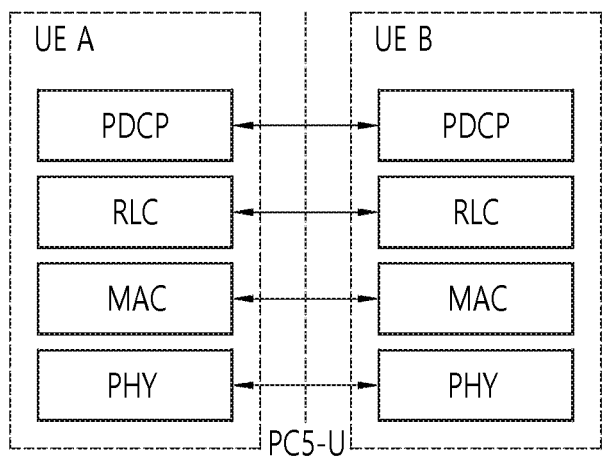
FIG. 6 shows a user plane protocol stack for ProSe direct communication.

FIG. 6 shows a user plane protocol stack for ProSe direct communication. Referring to FIG. 6, PDCP, RLC and MAC sublayers (terminate at the other UE) perform the functions listed for the user plane. The AS protocol stack in the PC5-U interface consists of PDCP, RLC, MAC and PHY.

There is no HARQ feedback for ProSe direct communication. RLC unacknowledged mode (UM) is used for ProSe direct communication. A receiving UE needs to maintain at least one RLC UM entity per transmitting peer UE. A receiving RLC UM entity used for ProSe direct communication does not need to be configured prior to reception of the first RLC unacknowledged mode data (UMD) protocol data unit (PDU). Robust header compression (ROHC) unidirectional mode is used for header compression in PDCP for ProSe direct communication.

A UE may establish multiple logical channels. Logical channel ID (LCID) included within the MAC subheader uniquely identifies a logical channel within the scope of one source Layer-2 ID and ProSe layer-2 group ID combination. Parameters for logical channel prioritization are not configured.

Figure 7:
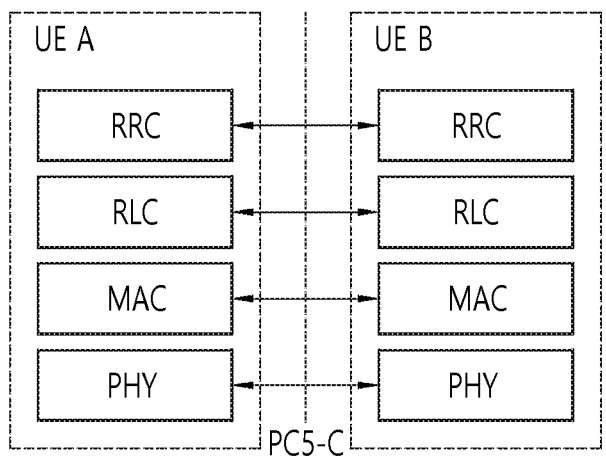
FIG. 7 shows a control plane protocol stack for ProSe direct communication.

FIG. 7 shows a control plane protocol stack for ProSe direct communication. Referring to FIG. 7, PDCP, the AS protocol stack for SBCCH in the PC5-C interface consists of RRC, RLC, MAC and PHY. A UE does not establish and maintain a logical connection to receiving UEs prior to a ProSe direct communication.

For ProSe direct communication, the UE supporting ProSe direct communication can operate in two modes for resource allocation, which include Mode 1 (scheduled resource allocation) and Mode 2 (UE autonomous resource selection). In Mode 1, the UE needs to be RRC_CONNECTED in order to transmit data. The UE requests transmission resources from the eNB. The eNB schedules transmission resources for transmission of sidelink control and data. The UE sends a scheduling request (dedicated scheduling request (D-SR) or random access) to the eNB followed by a ProSe buffer status report (BSR). Based on the ProSe BSR, the eNB can determine that the UE has data for a ProSe direct communication transmission and estimate the resources needed for transmission. The eNB can schedule transmission resources for ProSe direct communication using configured sidelink radio network temporary identifier (SL-RNTI). In Mode 2, a UE on its own selects resources from resource pools and performs transport format selection to transmit sidelink control and data.

A UE in RRC_CONNECTED may send a ProSe UE Information indication to eNB when UE becomes interested in ProSe Direct Communication. In response eNB may configure the UE with a SL-RNTI.

A UE is considered in-coverage for ProSe direct communication whenever it detects a cell on a public safety ProSe carrier. If the UE is out of coverage for ProSe direction communication, it can only use Mode 2. If the UE is in coverage for ProSe direct communication, it may use Mode 1 or Mode 2 as per eNB configuration. If the UE is in coverage for ProSe direct communication, it shall use only Mode 1 unless one of the exceptional cases occurs. When an exceptional case occurs, the UE is allowed to use Mode 2 temporarily even though it was configured to use Mode 1. Resource pool to be used during exceptional case may be provided by eNB.

A UE that is camped or connected on one carrier frequency but interested in ProSe direct communication operation on another carrier frequency (i.e. public safety ProSe carrier) shall attempt to find cells on the public safety ProSe carrier. An RRC_IDLE UE camped on a cell in another carrier frequency, but in the coverage area of an E-UTRA cell on public safety ProSe carrier, may consider the public safety ProSe carrier to be highest priority, and reselects to the cell on the public safety ProSe carrier. UE may consider a frequency (non-public safety ProSe carrier) to be highest priority if it can perform ProSe direct communication only while camping on the frequency.

An RRC_CONNECTED UE served by a cell in another carrier frequency may send a ProSe UE Information indication to its serving cell when it wants to perform ProSe direct communication. The indication contains the intended public safety ProSe carrier. The serving cell indicates with the presence of SIB 18 whether the UE is allowed to send the ProSe UE Information indication. The serving cell may configure an inter-frequency radio resource management (RRM) measurement on the public safety ProSe carrier. Once the UE enters coverage of a cell on the public safety ProSe carrier, based on measurement report, the eNB performs inter-frequency mobility to the public safety ProSe carrier. If inter-frequency mobility is not performed by the serving cell, or if it fails, the UE may still perform ProSe direct communication using Mode 2 from the resource pools, if any, broadcasted by the detected E-UTRA cell on the public safety ProSe carrier.

If the UE does not detect an E-UTRA cell on the public safety ProSe carrier, the UE can use public safety ProSe carrier resources preconfigured in the universal integrated circuit card (UICC) or mobile equipment (ME) for out of coverage ProSe direct communication. If the UE detects an E-UTRA cell on the public safety ProSe carrier, the UE stops using resources preconfigured in the UICC or ME. UE may use Mode 2 from the resource pools, if any, broadcasted by the detected E-UTRA cell on the public safety ProSe carrier. For Rel-12, all ProSe communication (for a UE) is performed on a single preconfigured public safety ProSe carrier, which is valid in the operating region. Higher layers check validity of the public safety ProSe carrier in the operating region.

The cell on the public safety ProSe carrier may provide a transmission resource pool for Mode 2 in SIB 18. UEs that are authorized for Prose direct communication may use these resources for ProSe direct communication in RRC_IDLE in the cell in the same carrier (i.e. public safety ProSe carrier). UEs that are authorized for ProSe direct communication may use these resources for ProSe direct communication in RRC_IDLE in the cell on the same carrier (i.e. public safety ProSe carrier). UEs that are authorized for ProSe direct communication may use these resources for ProSe direct communication in RRC_IDLE or RRC_CONNECTED in a cell on another carrier.

Alternatively, the cell on the public safety ProSe carrier may indicate in SIB 18 that it supports ProSe direct communication but does not provide transmission resources. UEs need to enter RRC_CONNECTED to perform ProSe direct communication transmission. In this case, the cell on the public safety ProSe carrier may provide, in broadcast signaling, an exceptional transmission resource pool for Mode 2, to be used by the UE in exceptional cases. A UE in RRC_CONNECTED that is authorized to perform ProSe direct communication transmission indicates to the serving eNB that it wants to perform ProSe direct communication transmissions. The eNB validates whether the UE is authorized for ProSe direct communication transmission using the UE context received from MME. The eNB may configure a UE by dedicated signaling with a transmission resource pool for Mode 2. That may be used without constraints while the UE is RRC_CONNECTED. Alternatively, the eNB may configure a UE to use the exceptional transmission resource pool for Mode 2 which the UE is allowed to use only in exceptional cases, and rely on scheduled resource allocation otherwise.

The resource pools for sidelink control when the UE is out of coverage are pre-configured for reception and transmission. The resource pools for sidelink control when the UE is in coverage for ProSe direct communication are configured as below. The resource pool used for reception is configured by the eNB via RRC, in broadcast signaling. The resource pool used for transmission is configured by the eNB via RRC, in dedicated or broadcast signaling, if Mode 2 is used. The resource pool used for transmission is configured by the eNB via RRC, in dedicated signaling, if Mode 1 is used. The eNB schedules the specific resource(s) for sidelink control transmission within the configured reception pool. In order to perform communication even when some UEs are in-coverage and some UEs are out of coverage, all UEs (i.e. both in and out of coverage) should be configured with reception resource pools for sidelink control which are the union of the resource pools used for transmission of sidelink control in the serving cell and neighbor cells and transmission of sidelink control for out of coverage.

The resource pools for data when the UE is out of coverage for ProSe direct communication are pre-configured for reception and transmission. The resource pools for data when the UE is in coverage for ProSe direct communication are configured by the eNB via RRC, in dedicated or broadcast signaling, if Mode 2 is used, for reception and transmission. There is no resource pool for transmission if Mode 1 is used.

ProSe direct discovery is defined as the procedure used by the UE supporting ProSe direct discovery to discover other UE(s) in its proximity, using E-UTRA direct radio signals via PC5. ProSe direct discovery is supported only when the UE is served by E-UTRAN. Upper layer handles authorization for announcement and monitoring of discovery message. Content of discovery message is transparent to AS and no distinction in AS is made for ProSe direct discovery models and types of ProSe direct discovery. The ProSe protocol ensures that only valid discovery messages are delivered to AS for announcement.

The UE can participate in announcing and monitoring of discovery message in both RRC_IDLE and RRC_CONNECTED states as per eNB configuration. The UE announces and monitors its discovery message subject to the half-duplex constraint. The UE that participates in announcing and monitoring of discovery messages maintains the current coordinated universal time coordinated (UTC) time. The UE that participates in announcing transmits the discovery message which is generated by the ProSe protocol taking into account the UTC time upon transmission of the discovery message. In the monitoring UE, the ProSe protocol provides the message to be verified together with the UTC time upon reception of the message to the ProSe function.

In order to perform synchronization, UE(s) participating in announcing of discovery messages may act as a synchronization source by transmitting a synchronization signal based on the resource information for synchronization signals provided in SIB 19.

There are three range classes. Upper layer authorization provides applicable range class of the UE. Maximum allowed transmission power for each range class is signaled in SIB 19. UE uses the applicable maximum allowed transmission power corresponding to its authorized range class. This puts an upper limit on the determined transmit power based on open loop power control parameters.

Figure 8:
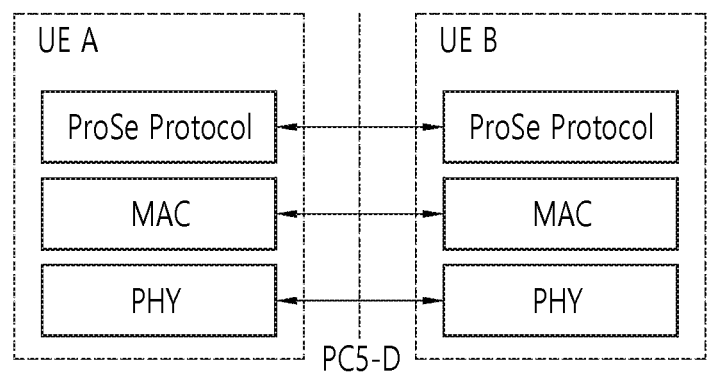
FIG. 8 shows PC5 interface for ProSe direct discovery.

FIG. 8 shows PC5 interface for ProSe direct discovery. Referring to FIG. 8, UE A and UE B perform ProSe direct discovery using ProSe protocol via PC5-D. Radio protocol stack (AS) for ProSe direct discovery consists of only MAC and PHY. The AS layer performs function of interfaces with upper layer (ProSe Protocol). The MAC layer receives the discovery message from the upper layer (ProSe Protocol). The IP layer is not used for transmitting the discovery message. The AS layer also performs function of scheduling. The MAC layer determines the radio resource to be used for announcing the discovery message received from upper layer. The AS layer also performs function of discovery PDU generation. The MAC layer builds the MAC PDU carrying the discovery message and sends the MAC PDU to the physical layer for transmission in the determined radio resource. No MAC header is added.

There are two types of resource allocation for discovery message announcement, which include Type 1 (UE autonomous resource selection) and Type 2 (scheduled resource allocation). Type 1 is a resource allocation procedure where resources for announcing of discovery message are allocated on a non UE specific basis. In Type 1, the eNB provides the UE(s) with the resource pool configuration used for announcing of discovery message. The configuration may be signaled in broadcast or dedicated signaling. The UE autonomously selects radio resource(s) from the indicated resource pool and announce discovery message. The UE can announce discovery message on a randomly selected discovery resource during each discovery period. Type 2 is a resource allocation procedure where resources for announcing of discovery message are allocated on per UE specific basis. In Type 2, the UE in RRC_CONNECTED may request resource(s) for announcing of discovery message from the eNB via RRC. The eNB assigns resource(s) via RRC. The resources are allocated within the resource pool that is configured in UEs for monitoring.

For UEs in RRC_IDLE, the eNB may provide a resource pool for Type 1 based discovery message announcement in SIB 19. UEs that are authorized for Prose direct discovery use these resources for announcing discovery message in RRC_IDLE. Alternatively, the eNB may indicate in SIB 19 that it supports ProSe direct discovery but does not provide resources for discovery message announcement. UEs need to enter RRC_CONNECTED in order to request resources for discovery message announcement.

For UEs in RRC_CONNECTED, a UE authorized to perform ProSe direct discovery announcement indicates to the eNB that it wants to perform ProSe direct discovery announcement. The eNB validates whether the UE is authorized for ProSe direct discovery announcement using the UE context received from MME. The eNB may configure the UE with resource pool for Type 1 for discovery message announcement via dedicated signaling. The eNB may configure resource pool along with dedicated resource in the form of time and frequency indices for discovery message announcement via dedicated RRC signaling. The dedicated resources allocated by the eNB are valid until the eNB re-configures the resource(s) by RRC signaling, or the UE enters RRC_IDLE.

Authorized receiving UEs in RRC_IDLE and RRC_CONNECTED monitor resource pools used for Type 1 and resource pools for Type 2. The eNB provides the resource pool configuration used for discovery message monitoring in SIB 19. The SIB 19 may contain detailed ProSe direct discovery configuration used for announcing in neighbor cells of intra-frequency as well.

Synchronous and asynchronous deployments are supported. Discovery resources can be overlapping or non-overlapping across cells.

A UE, if authorized by the network, can announce discovery message only on serving cell. The UE can monitor discovery resources in the same as well as other frequencies than the serving cell, in same or different PLMNs. The serving cell may provide in SIB 19 a list of frequencies along with PLMN ID on which the UE may aim to monitor discovery message. The serving cell does not provide detailed ProSe discovery configuration for other carrier frequencies. The UE shall read SIB 19 and other relevant SIBs on other carriers if it wants to perform discovery message monitoring on those carriers. Obtaining ProSe direct discovery configuration by reading SIB 19 (and other SIBs) of an inter-frequency and/or inter-PLMN cell shall not affect the UE's Uu reception on the serving cell(s). The UE performs intra-frequency ProSe direct discovery announcement in subframes in which a ProSe direct discovery resource pool is configured and the UE is not expected to perform uplink Uu transmission. In this case, the UE shall not create autonomous gaps. Intra-frequency, inter-frequency and inter-PLMN ProSe direct discovery monitoring shall not affect Uu reception. The UE uses DRX occasions in RRC_IDLE and RRC_CONNECTED or second RX chain if it is available, for intra-frequency, inter-frequency and inter-PLMN discovery message monitoring. The UE shall not create autonomous gaps. An RRC_CONNECTED UE sends ProSe UE Information indication to the serving cell if it is interested or no longer interested in intra-frequency, inter-frequency or inter-PLMN discovery message monitoring.

Figure 9:
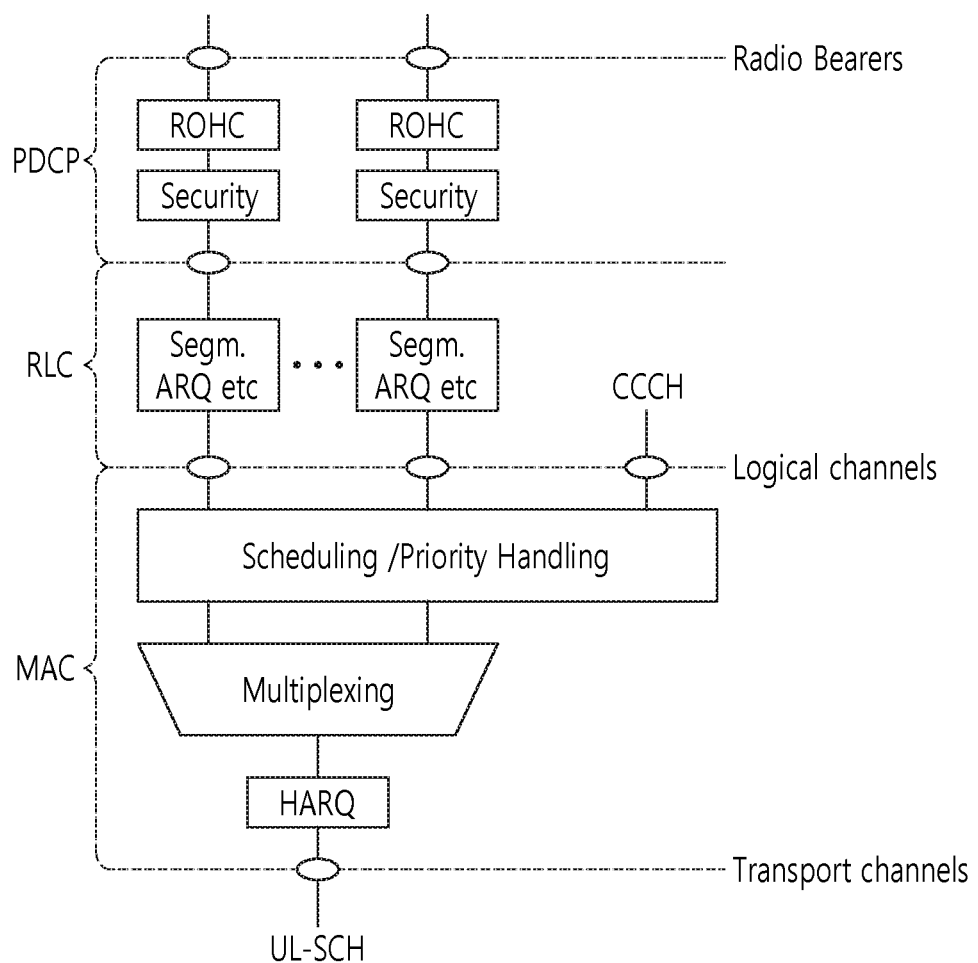
FIG. 9 shows L2 structure for UL.
Figure 10:
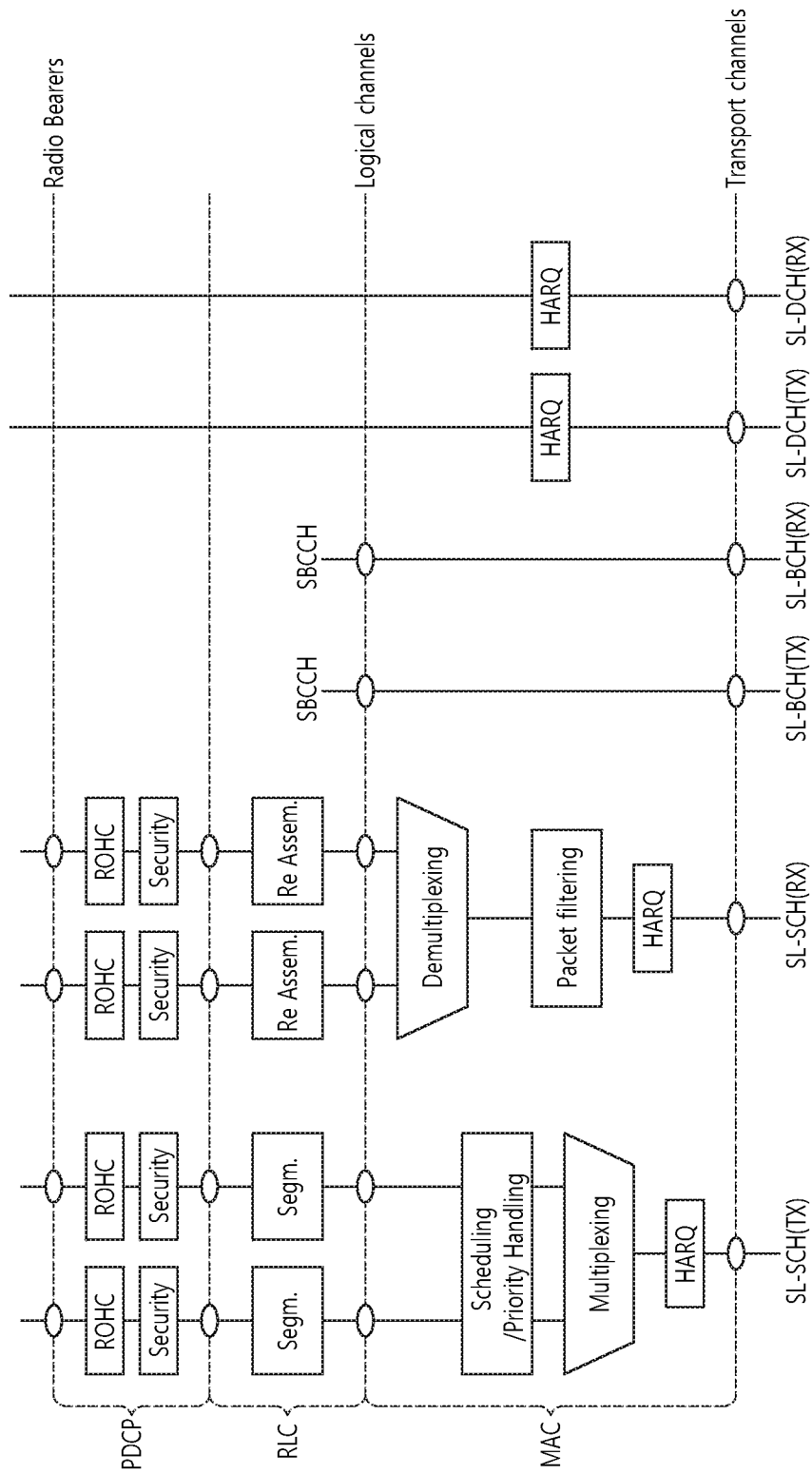
FIG. 10 shows L2 structure for SL.

FIG. 9 shows L2 structure for UL. FIG. 10 shows L2 structure for SL. Layer 2 is split into the sublayers of MAC, RLC and PDCP. Referring to FIG. 9, in UL, only one transport block is generated per transmission time interval (TTI) in the absence of spatial multiplexing. Referring to FIG. 10, in SL, only one transport block is generated per TTI. And in SL, transmission (TX) entity and reception (RX) entity are configured separately.

BSR is needed to provide support for quality of service (QoS)-aware packet scheduling. In E-UTRAN, BSR refers to the data that is buffered in for a group of logical channel (LCG) in the UE. BSR is transmitted using MAC signaling. The UL BSR procedure is used to provide the serving eNB with information about the amount of UL data available for transmission in the UL buffers associated with the MAC entity. The SL BSR procedure is used to provide the serving eNB with information about the amount of SL data available for transmission in the SL buffers of the MAC entity.

Figure 11:
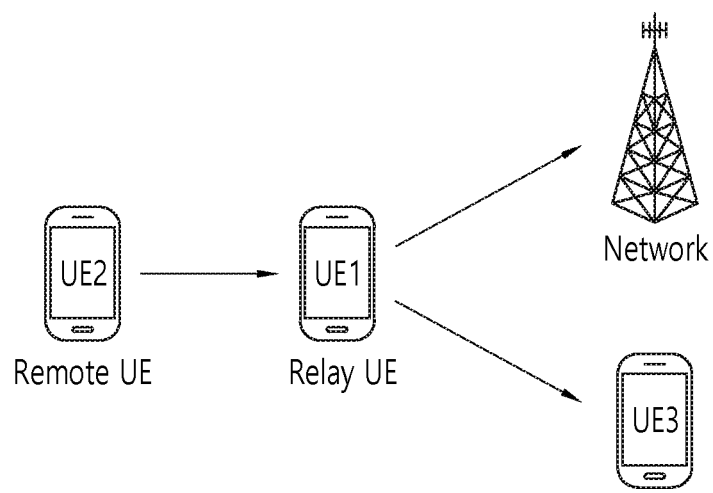
FIG. 11 shows an example of UE-to-Network Relay and UE-to-UE Relay.

FIG. 11 shows an example of UE-to-Network Relay and UE-to-UE Relay. Referring to FIG. 11, UE1 performs as a ProSe UE-to-Network Relay UE (hereinafter, relay UE). Relay UE is a UE that provides functionality to support connectivity to unicast services for remote UE(s). UE2 performs as a remote UE. Remote UE is a ProSe-enabled public safety UE that communicates with a PDN via a ProSe UE-to-Network Relay. That is, UE1, i.e. relay UE, receives from control signal/data from UE2, i.e. remote UE, which is required to be relayed to the network or another UE, i.e. UE3. If the control signal/data is relayed to the network, it may consist of UE-to-Network Relay. If the control signal/data is relayed to UE3, it may consist of UE-to-UE Relay.

From the perspective of the remote UE, there may be some data which needs to be relayed to the network among one-to-many communication. However, the current MAC procedure, specifically BSR procedure, does not support UE-to-Network Relay and/or UE-to-UE Relay.

In order to solve the problem described above, a method for performing a BSR procedure for relay according to an embodiment of the present invention is proposed below. In the description below, UE-to-Network Relay may be mainly focused for the convenience, however, the present invention is not limited to thereto. The present invention described below may be applied to UE-to-UE Relay as well. Relay may refer to UE-to-UE relay as well as UE-to-Network Relay in the description below. Further, it is assumed that UE1 (receiver UE) is relay UE that can provide the relay service and UE2 (transmitter UE) is a remote UE that wants to get the relay service. Further, there may be two types of relay services, one of which is a relay service for 1:M data transmitted by remote UE and the other is a relay service for 1:1 data transmitted by remote UE.

For UE-to-Network Relay, if relayed data is delivered from the remote UE towards the network, the data is delivered from PC5 interface (in SL) to Uu interface (in UL) in the relay UE. According to an embodiment of the present invention, the UL BSR or the SL BSR may be used to inform the serving eNB about the amount of data available for UL transmission of relayed data. That is, for reflecting a buffer status of relayed data, the UL BSR or SL BSR may be used. In this case, a LCG may be dedicated to relay in the UL BSR or SL BSR.

Further, according to another embodiment of the present invention, the buffer size reflecting relayed data in the UL BSR or SL BSR may include not only UL data in a TX L2 entity over Uu interface, but also SL data in a RX L2 entity over PC5 interface (i.e. relayed data). If the UL BSR is used for relayed data, data available for relay transmission in a RX L2 entity over PC5 interface may trigger the UL BSR. If the SL BSR is used for relayed data, data available for relay transmission in a TX L2 entity over Uu interface may trigger the SL BSR. All triggered UL/SL BSRs reflecting relayed data from the ProSe Source for the ProSe Destination may be cancelled when the UL/SL BSR reflecting relayed data from the ProSe Source for the ProSe Destination is included in a MAC PDU for transmission.

Further, according to another embodiment of the present invention, when the UL BSR reflects relayed data for a group of which priority is changed due to emergency situation, the MAC entity of the relay UE may prioritize the UL BSR over the other BSRs in logical channel prioritization procedure. When the SL BSR reflects relayed data for a group of which priority is changed due to emergency situation, the MAC entity of the relay UE may prioritize the SL BSR over the other SL BSRs in logical channel prioritization procedure, or may prioritize the SL BSR over BSRs and the other SL BSRs in logical channel prioritization procedure.

Figure 12:
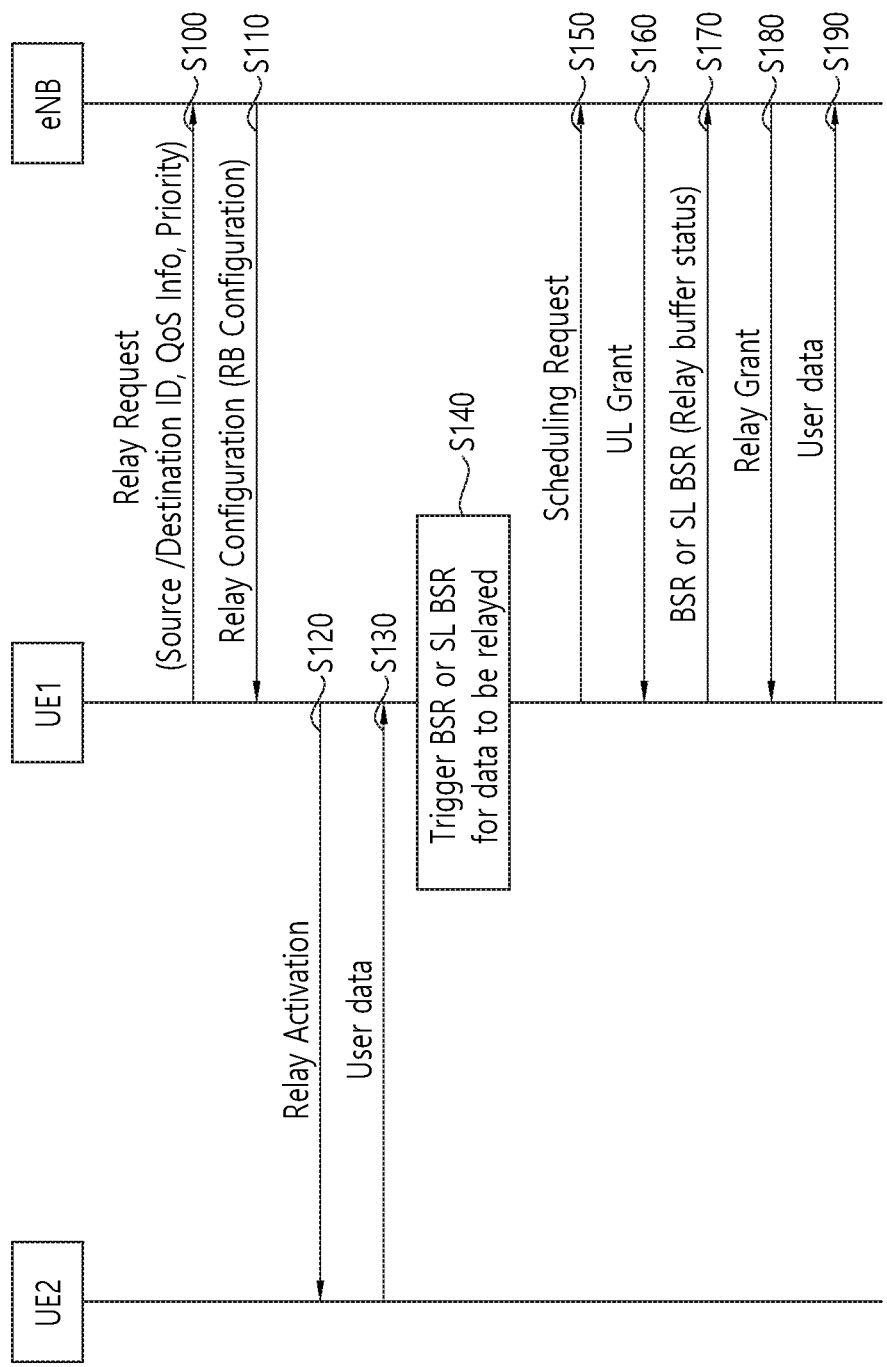
FIG. 12 shows a UE-to-Network Relay procedure according to an embodiment of the present invention.

FIG. 12 shows a UE-to-Network Relay procedure according to an embodiment of the present invention.

In step S100, if the UE1 can support relay of data in a group, the UE1 transmits a relay request to the eNB. The relay request may include at least one of source ID, destination ID, QoS related to services in the group, or any priority related to mission critical push-to-talk (MCPTT).

In step S110, the eNB transmits a relay configuration to the UE1 to configure the UE1 with a data radio bearer which is only used to relay data. Upon receiving the relay configuration, the UE1 may perform as the relay UE in UE-to-Network Relay. Relayed data for different sources/destinations may be carried via different radio bearers. That is, a radio bearer for relaying data may be configured for each source ID, each destination ID, or a combination of source ID and destination ID. Further, via the relay configuration, the eNB may inform the UE1 which radio bearer is used to relay data between another UE and the eNB for a source ID and a destination ID. The eNB may inform the UE1 of mapping relationship between a LCID and a combination of a source ID and a destination ID, mapping relationship between a LCID and a source ID, or mapping relationship between a LCID and a destination ID.

In step S120, the UE1 transmits a relay activation to the UE2 to indicate that the UE1 is ready to relay data transmitted from the UE2. The relay activation may be transmitted via SL-BCH.

If the UE2 detects that there is a relay UE (e.g. the UE1) nearby by receiving the relay activation, in step S130, the UE2 transmits user data in sidelink to the UE1. The UE2 may indicate to a relay UE (e.g. the UE1) whether the user data needs to be relayed via SL-BCH, sidelink control information (SCI), or SL-SCH. SL-BCH may be used to indicate to a relay UE that all user data received for a certain combination of source ID and destination ID should be relayed. SCI may be used to indicate to a relay UE that all user data received in the corresponding SC period should be relayed. As a result, the UE1 may determine whether to relay the user data in every SC period. MAC sub-header or MAC control element (CE) included in a MAC PDU on SL-SCH may be used to indicate to a relay UE that the MAC PDU should be relayed. As a result, the UE1 may determine whether to relay the user data by every MAC PDU.

Upon receiving the user data from the UE2, the UE1 receives RLC/PDCP service data units (SDUs) from the UE2 in sidelink and stores in RX L2 buffer of RX RLC/PDCP entities for sidelink. For relaying L2 SDU, e.g. from PC5 interface to Uu interface (i.e. UE-to-Network Relay) or from one PC5 interface to another PC5 interface (i.e. UE-to-UE Relay), L2 SDUs in RX L2 entity in sidelink are transferred to L2 SDUs in TX L2 entity in uplink (i.e. UE-to-Network Relay) or in sidelink (i.e. UE-to-UE Relay). For UE-to-Network Relay, it is likely that PDCP SDUs in TX PDCP entity in sidelink are delivered to PDCP SDUs in TX PDCP entity in uplink. The RX PDCP entity over PC5 interface delivers PDCP SDUs to TX PDCP entity over Uu interface either out of sequence or in sequence. Then, those PDCP SDUs are processed in TX PDCP/RLC entities.

In step S140, the UE1 checks UE buffer for relaying the user data and triggers BSR (i.e. UL BSR) or SL BSR for data to be relayed. That is, in order for the UE1 to relay the user data received from the eNB2 in sidelink to the eNB in uplink, the BSR or the SL BSR may provide the serving eNB with information about the amount of data available for relaying the user data to be relayed.

(1) BSR may reflect the user data to be relayed. That is, BSR may provide the serving eNB with information about the amount of data available for relaying the user data to be relayed. In this case, an LCG may be dedicated to relaying. The eNB may configure which LCG is dedicated to relaying. The BSR may indicate which LCG in the BSR reflects the amount of data available for relaying the user data to be relayed. The BSR may indicates whether or not the BSR reflects the amount of data available for relaying the user data received from the remote UE.

If the UE1 performs relaying, the UE1 may perform different independent BSR procedures for different sources, for different destinations, or for different combinations of source and destination, when the UE1 relays the user data from those source UEs to those destination UEs. Namely, the UE1 may perform a BSR procedure per source ID, per destination ID, or per combination of source ID and destination ID. For example, different timers related to the BSR may be configured for each BSR procedure. Further, cancelling triggered BSRs may be performed independently for each BSR procedure.

The buffer size field included in the BSR reflecting the relayed data may identify the total amount of data available across all logical channels of a logical channel group for a source ID, a destination ID, or a combination of a source ID and a destination ID after all MAC PDUs for the TTI have been built. The buffer size field included in the BSR reflecting the relayed data may include all data that is available for transmission not only in the TX RLC/PDCP entities over Uu interface but also in the RX RLC/PDCP entities over PC5 interface.

When the BSR reflects the relayed data for a group of which priority is changed due to emergency situation, the MAC entity of the relay UE may prioritize the BSR over the other BSRs in logical channel prioritization procedure.

(2) SL BSR may reflect the user data to be relayed. That is, the SL BSR may provide the serving eNB with information about the amount of data available for relaying the user data to be relayed. In this case, an LCG may be dedicated to relaying. The eNB may configure which LCG is dedicated to relaying. The SL BSR may indicate which LCG in the SL BSR reflects the amount of data available for relaying the user data to be relayed. The SL BSR indicates which group index in the SL BSR reflects the amount of data available for relaying the user data to be relayed. The SL BSR may indicate whether or not the SL BSR reflects the amount of data available for relaying the user data to be relayed.

If the UE1 performs relaying, the UE1 may perform different independent SL BSR procedures for different sources, for different destinations, or for different combinations of source and destination, when the UE1 relays the user data from those source UEs to those destination UEs. Namely, the UE1 may perform a SL BSR procedure per source ID, per destination ID, or per combination of source ID and destination ID. For example, different timers related to the SL BSR may be configured for each SL BSR procedure. Further, cancelling triggered SL BSRs may be performed independently for each SL BSR procedure.

The buffer size field included in the SL BSR reflecting the relayed data may identify the total amount of data available across all logical channels of a logical channel group for a source ID, a destination ID, or a combination of a source ID and a destination ID after all MAC PDUs for the TTI have been built. The buffer size field included in the SL BSR reflecting the relayed data may include all data that is available for transmission not only in the TX RLC/PDCP entities over Uu interface but also in the RX RLC/PDCP entities over PC5 interface.

When the SL BSR reflects the relayed data for a group of which priority is changed due to emergency situation, the MAC entity of the relay UE may prioritize the SL BSR over the other SL BSRs in logical channel prioritization procedure, or may prioritize the SL BSR over BSRs and the other SL BSRs in logical channel prioritization procedure.

In step S150, a scheduling request (SR) may be triggered in a BSR procedure or SL BSR procedure, and may transmit to the eNB. If the eNB configures PUCCH resources dedicated to relaying, the SR triggered due to relaying may be carried on the PUCCH resource dedicated to relaying. Otherwise, the SR may be carried via the same PUCCH resources or via random access procedure.

In step S160, the UE1 receives a UL grant from the eNB. The UE1 may monitor a RNTI dedicated to relaying and then receive the UL grant dedicated to relaying. The RNTI may be dedicated to relaying, a ProSe Source, a ProSe Destination, or a combination of a ProSe Source and a ProSe Destination.

In step S170, the UE1 transmits the triggered BSR or the triggered SL BSR.

In step S180, the eNB transmits a relay grant to the UE1.

In step S190, the UE1 transmits the user data to be relayed to the eNB.

When the BSR is used to reflect the user data to be relayed, the BSR procedure may be performed as follows. The BSR procedure is used to provide the serving eNB with information about the amount of data available for transmission in the UL buffers associated with the MAC entity. The amount of data includes data to be relayed from another UE to the serving eNB. RRC controls BSR reporting by configuring the three timers periodicBSR-Timer, retxBSR-Timer and logicalChannelSR-ProhibitTimer and by, for each logical channel, optionally signalling logicalChannelGroup which allocates the logical channel to an LCG. For the BSR procedure, the MAC entity shall consider all radio bearers which are not suspended and may consider radio bearers which are suspended.

A BSR shall be triggered if any of the following events occur:

UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the BSR MAC CE plus its subheader, in which case the BSR is referred below to as "Padding BSR";

retxBSR-Timer expires and the MAC entity has data available for transmission for any of the logical channels which belong to a LCG, in which case the BSR is referred below to as "Regular BSR";

periodicBSR-Timer expires, in which case the BSR is referred below to as "Periodic BSR".

if the MAC entity is configured for relay, SL data received in sidelink, for a sidelink logical channel of a ProSe Source, a ProSe Destination, or a combination of a ProSe Source and a ProSe Destination, becomes available for relay transmission in the receiving RLC entity over PC5 or in the receiving PDCP entity over PC5 and there is currently no data available for transmission for any of the sidelink logical channels belonging to the same ProSe Source, the same ProSe Destination, or the same combination of a ProSe Source and a ProSe Destination, in which case the Sidelink BSR is referred below to as "Regular Sidelink BSR";

For Regular BSR:

1> if the BSR is triggered due to data becoming available for transmission for a logical channel for which logical-ChannelSR-ProhibitTimer is configured by upper layers:

2> if not running, start the logicalChannelSR-ProhibitTimer;

1> else:

2> if running, stop the logicalChannelSR-ProhibitTimer.

For Regular and Periodic BSR:

1> if more than one LCG has data available for transmission in the TTI where the BSR is transmitted: report Long BSR;

1> else report Short BSR.

For Padding BSR:

1> if the number of padding bits is equal to or larger than the size of the Short BSR plus its subheader but smaller than the size of the Long BSR plus its subheader:

2> if more than one LCG has data available for transmission in the TTI where the BSR is transmitted: report Truncated BSR of the LCG with the highest priority logical channel with data available for transmission;

2> else report Short BSR.

1> else if the number of padding bits is equal to or larger than the size of the Long BSR plus its subheader, report Long BSR.

If the BSR procedure determines that at least one BSR has been triggered and not cancelled:

1> if the MAC entity has UL resources allocated for new transmission for this TTI:

2> instruct the Multiplexing and Assembly procedure to generate the BSR MAC CE(s);

2> start or restart periodicBSR-Timer except when all the generated BSRs are Truncated BSRs;

2> start or restart retxBSR-Timer.

1> else if a Regular BSR has been triggered and logical-ChannelSR-ProhibitTimer is not running:

2> if an uplink grant is not configured or the Regular BSR was not triggered due to data becoming available for transmission for a logical channel for which logical channel SR masking (logicalChannelSR-Mask) is setup by upper layers:

3> a scheduling request shall be triggered.

2> else if the Regular BSR was triggered due to data becoming available for transmission for a logical channel for relay purpose; or if the Regular BSR was triggered due to data becoming available for transmission from the group of which priority was changed to higher priority e.g. emergency situation.

3> a scheduling request shall be triggered.

A MAC PDU shall contain at most one MAC BSR CE, even when multiple events trigger a BSR by the time a BSR can be transmitted in which case the Regular BSR and the Periodic BSR shall have precedence over the padding BSR. The MAC entity shall restart retxBSR-Timer upon indication of a grant for transmission of new data on any UL-SCH.

All triggered BSRs shall be cancelled in case the UL grant(s) in this subframe can accommodate all pending data available for transmission but is not sufficient to additionally accommodate the BSR MAC CE plus its subheader. All triggered BSRs except BSRs reflecting relayed data shall be cancelled when a BSR not reflecting relayed data is included in a MAC PDU for transmission. All triggered BSRs reflecting relayed data from the ProSe Source shall be cancelled when a BSR reflecting relayed data from the ProSe Source is included in a MAC PDU for transmission. Alternatively, all triggered BSRs reflecting relayed data for the ProSe Destination shall be cancelled when a BSR reflecting relayed data for the ProSe Destination is included in a MAC PDU for transmission. Alternatively, all triggered BSRs reflecting relayed data from the ProSe Source for the ProSe Destination shall be cancelled when a BSR reflecting relayed data from the ProSe Source for the ProSe Destination is included in a MAC PDU for transmission.

The MAC entity shall transmit at most one Regular/Periodic BSR in a TTI. If the MAC entity is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG. A Padding BSR is not allowed to cancel a triggered Regular/Periodic BSR. A Padding BSR is triggered for a specific MAC PDU only and the trigger is cancelled when this MAC PDU has been built.

BSR MAC CEs consist of either:

short BSR and truncated BSR format: one LCG ID field and one corresponding buffer size field; or long BSR format: four buffer size fields, corresponding to LCG IDs #0 through #3.

Figure 13:
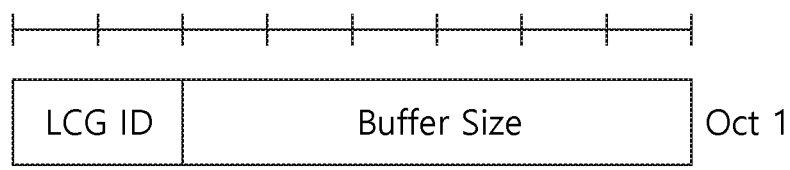
FIG. 13 shows an example of short BSR and truncated BSR MAC CE.
Figure 14:
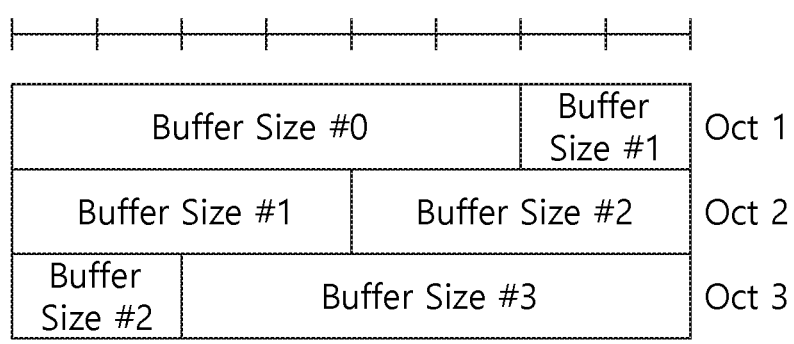
FIG. 14 shows an example of long BSR MAC CE.

FIG. 13 shows an example of short BSR and truncated BSR MAC CE. FIG. 14 shows an example of long BSR MAC CE.

The BSR formats are identified by MAC PDU subheaders with LCIDs.

The fields LCG ID and buffer size are defined as follow:

LCG ID: The LCG ID field identifies the group of logical channel(s) which buffer status is being reported. The length of the field is 2 bits. A specific LCG ID is dedicated to reflect buffer status for relaying data in the group of logical channel(s) to eNB.

Buffer size: The buffer size field identifies the total amount of data available across all logical channels of a logical channel group after all MAC PDUs for the TTI have been built. The amount of data is indicated in number of bytes. It shall include all data that is available for transmission not only in the transmitting RLC layer and in the transmitting PDCP layer over Uu but also in the receiving RLC layer and the receiving PDCP layer over PC5. The size of the RLC and MAC headers are not considered in the buffer size computation. The length of this field is 6 bits.

When the SL BSR is used to reflect the user data to be relayed, the SL BSR procedure may be performed as follows. The SL BSR procedure is used to provide the serving eNB with information about the amount of sidelink data available for sidelink transmission in the SL buffers of the MAC entity as well as the amount of data available for uplink transmission in the UL buffers of the MAC entity for relaying data from another UE to the serving eNB. RRC controls BSR reporting for the sidelink by configuring the two timers periodic-BSR-TimerSL and retx-BSR-TimerSL. Each sidelink logical channel is allocated to an LCG with LCGID set to "11" and belongs to a ProSe destination.

A SL BSR shall be triggered if any of the following events occur:

1> if the MAC entity has a configured SL-RNTI:

2> SL data, for a sidelink logical channel of a ProSe destination, becomes available for transmission in the RLC entity or in the PDCP entity and there is currently no data available for transmission for any of the sidelink logical channels belonging to the same ProSe destination, in which case the SL BSR is referred below to as "Regular SL BSR";

2> UL resources are allocated and number of padding bits remaining after a Padding BSR has been triggered is equal to or larger than the size of the Sidelink BSR MAC CE containing the buffer status for at least one ProSe destination plus its subheader, in which case the SL BSR is referred below to as "Padding SL BSR";

2> retx-BSR-TimerSL expires and the MAC entity has data available for transmission for any of the sidelink logical channels, in which case the SL BSR is referred below to as "Regular SL BSR";

2> periodic-BSR-TimerSL expires, in which case the SL BSR is referred below to as "Periodic SL BSR";

1> else if the MAC entity is configured for relay:

2> UL data, for a logical channel which belongs to a LCG, becomes available for relay transmission in the transmitting RLC entity over Uu or in the transmitting PDCP entity over Uu and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

1> else:

2> An SL-RNTI is configured by upper layers and SL data is available for transmission in the RLC entity or in the PDCP entity, in which case the Sidelink BSR is referred below to as "Regular SL BSR".

For Regular and Periodic SL BSR:

1> if the number of bits in the UL grant is equal to or larger than the size of a SL BSR containing buffer status for all ProSe Destinations having data available for transmission plus its subheader:

2> report SL BSR containing buffer status for all ProSe Destinations having data available for transmission;

1> else report Truncated SL BSR containing buffer status for as many ProSe Destinations having data available for transmission as possible, taking the number of bits in the UL grant into consideration.

For Padding SL BSR:

1> if the number of padding bits remaining after a Padding BSR has been triggered is equal to or larger than the size of a SL BSR containing buffer status for all ProSe Destinations having data available for transmission plus its subheader:

2> report SL BSR containing buffer status for all ProSe Destinations having data available for transmission;

1> else report Truncated SL BSR containing buffer status for as many ProSe Destinations having data available for transmission as possible, taking the number of bits in the UL grant into consideration.

If the BSR procedure determines that at least one SL BSR has been triggered and not cancelled:

1> if the MAC entity has UL resources allocated for new transmission for this TTI and the allocated UL resources can accommodate a SL BSR MAC CE plus its subheader as a result of logical channel prioritization:

2> instruct the Multiplexing and Assembly procedure to generate the SL BSR MAC CE(s);

2> start or restart periodic-BSR-TimerSL except when all the generated SL BSRs are Truncated SL BSRs;

2> start or restart retx-BSR-TimerSL;

1> else if a Regular SL BSR has been triggered:

2> if an UL grant is not configured:

3> a scheduling request shall be triggered.

A MAC PDU shall contain at most one SL BSR MAC CE, even when multiple events trigger a SL BSR by the time a SL BSR can be transmitted in which case the Regular SL BSR and the Periodic SL BSR shall have precedence over the padding SL BSR. The MAC entity shall restart retx-BSR-TimerSL upon reception of an SL grant.

All triggered SL BSRs except SL BSRs reflecting relayed data shall be cancelled in case the remaining SL grant(s) valid for this SC period can accommodate all pending data available for transmission. All triggered SL BSRs except SL BSRs reflecting relayed data shall be cancelled when a SL BSR not reflecting relayed data (except for Truncated SL BSR) is included in a MAC PDU for transmission. All triggered SL BSRs shall be cancelled, and retx-BSR-TimerSL and periodic-BSR-TimerSL shall be stopped, when upper layers configure autonomous resource selection. All triggered SL BSRs reflecting relayed data from the ProSe Source shall be cancelled when a SL BSR reflecting relayed data from the ProSe Source is included in a MAC PDU for transmission. Alternatively, all triggered SL BSRs reflecting relayed data for the ProSe Destination shall be cancelled when a SL BSR reflecting relayed data for the ProSe Destination is included in a MAC PDU for transmission. Alternatively, all triggered SL BSRs reflecting relayed data from the ProSe Source for the ProSe Destination shall be cancelled when a SL BSR reflecting relayed data from the ProSe Source for the ProSe Destination is included in a MAC PDU for transmission.

The MAC entity shall transmit at most one Regular/Periodic SL BSR in a TTI. If the MAC entity is requested to transmit multiple MAC PDUs in a TTI, it may include a padding SL BSR in any of the MAC PDUs which do not contain a Regular/Periodic SL BSR.

All SL BSRs transmitted in a TTI always reflect the buffer status after all MAC PDUs have been built for this TTI. Each ProSe Destination shall report at the most one buffer status value per TTI and this value shall be reported in all SL BSRs reporting buffer status for this ProSe Destination. A Padding SL BSR is not allowed to cancel a triggered Regular/Periodic SL BSR. A Padding SL BSR is triggered for a specific MAC PDU only and the trigger is cancelled when this MAC PDU has been built.

SL BSR MAC CE consists of SL BSR and truncated SL BSR, which includes one group index field, one LCG ID field and one corresponding buffer size field per reported target group.

FIG. 15 shows an example of SL BSR MAC CE for even N. FIG. 16 shows an example of SL BSR MAC CE for odd N.

The SL BSR is identified by MAC PDU subheaders with LCID.

For each included group, the fields are defined as follow:

Group index: The group index field identifies the ProSe destination. The length of this field is 4 bits. The value is set to the index of the destination reported in destinationInfoList. A specific Group index is dedicated to reflect buffer status for relaying data in the group of logical channel(s) to eNB.

LCG ID: The LCG ID field identifies the group of logical channel(s) which buffer status is being reported. The length of the field is 2 bits and it is set to "11"; A specific LCG ID is dedicated to reflect buffer status for relaying data in the group of logical channel(s) to eNB.

Buffer Size: The buffer size field identifies the total amount of data available across all logical channels of a ProSe destination after all MAC PDUs for the TTI have been built. The amount of data is indicated in number of bytes. It shall include all data that is available for transmission not only in the transmitting RLC layer and in the transmitting PDCP layer over Uu but also in the receiving RLC layer and the receiving PDCP layer over PC5. The size of the RLC and MAC headers are not considered in the buffer size computation. The length of this field is 6 bits.

R: Reserved bit, set to "0".

Figure 17:
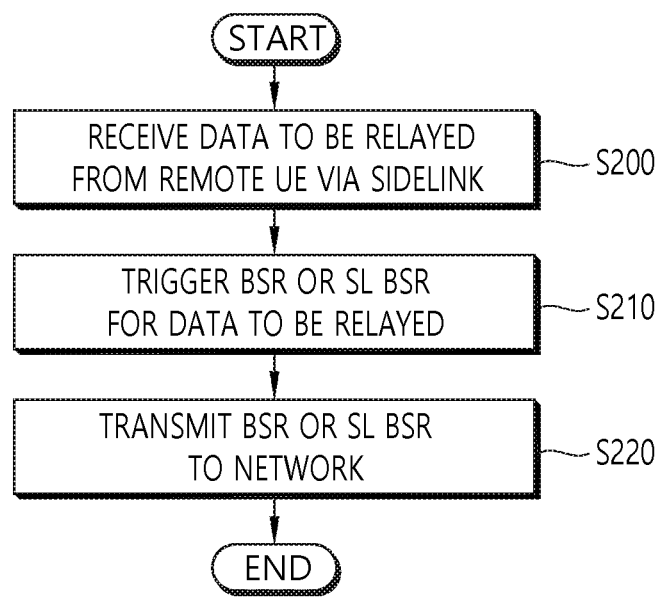
FIG. 17 shows a method for performing, by a relay UE, a BSR procedure according to an embodiment of the present invention.

FIG. 17 shows a method for performing, by a relay UE, a BSR procedure according to an embodiment of the present invention.

In step S200, the relay UE receives data to be relayed from a remote UE via sidelink. Before receiving the data to be relayed, the relay UE may transmit a relay request to the network. Further, the relay UE may receive a relay configuration, which configures a data radio bearer used to relay data only, from the network.

In step S210, the relay UE triggers a BSR or a sidelink BSR for the data to be relayed. The BSR or the sidelink BSR informs the network about amount of data available for UL transmission of the data to be relayed. The BSR or the SL BSR may include a specific LCG dedicated to relaying. A buffer size field in the BSR or the SL BSR may include UL data in a transmitting L2 entity over Uu interface and sidelink data in a receiving L2 entity over PC5 interface. In this case, the BSR may be triggered by data available in the receiving L2 entity over PC5 interface, and the SL BSR is triggered by the data available in the transmitting L2 entity over Uu interface.

The triggered BSR or the triggered sidelink BSR may be canceled when the BSR or the sidelink BSR is included in a MAC PDU. The BSR may be prioritized over other BSRs in a LCP procedure when the data for a group of which priority is changed due to emergency situation. The SL BSR may be prioritized over other sidelink BSRs in a LCP procedure when the data for a group of which priority is changed due to emergency situation. The SL BSR may be prioritized over BSRs and other sidelink BSRs in a LCP procedure when the data for a group of which priority is changed due to emergency situation.

In step S220, the relay UE transmits the BSR or the sidelink BSR to a network. After transmitting the BSR or the sidelink BSR, the relay UE may receive a relay grant from the network. The relay UE may transmit the data to be relayed to the network.

Figure 18:
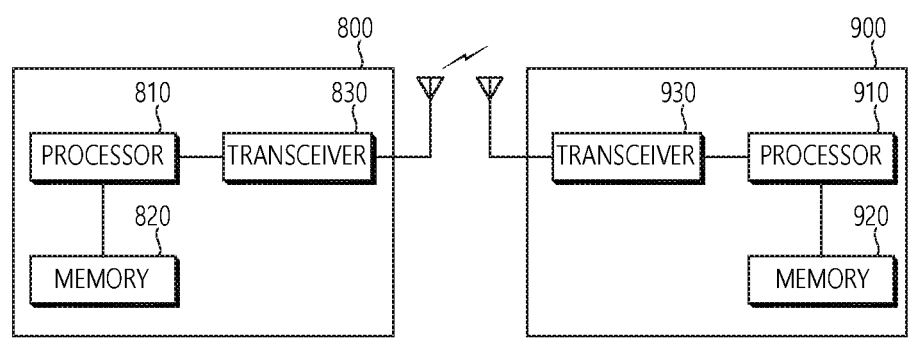
FIG. 18 shows a wireless communication system to implement an embodiment of the present invention.

FIG. 18 shows a wireless communication system to implement an embodiment of the present invention.

A relay UE 800 includes a processor 810, a memory 820 and a transceiver 830. The processor 810 is configured to implement proposed functions, procedures and/or methods described in this description. That is, according to the description above, the processor 810 is configured to trigger BSR or SL BSR which is used to inform the serving eNB about the amount of data available for uplink transmission of relayed data. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal. The transceiver 830 receives data to be relayed from a remote UE, and transmits the triggered BSR or SL/BSR to a network. The transceiver 830 transmits the data to be relayed to the network.

A remote UE or eNB 900 includes a processor 910, a memory 920 and a transceiver 930. The processor 910 is configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910.

The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a relay node in a wireless communication system, the method comprising:
   identifying relay data that is received from a lower node and to be forwarded to an upper node; and
   transmitting, to the upper node, at least one buffer status report (BSR) comprising information informing an amount of the relay data mapped to a logical channel group (LCG) identifier (ID) for the relay data,
   wherein the LCG ID for the relay data is dedicated to informing that a group of logical channels identified by the LCG ID is related to the relay data.

2. The method of claim 1, wherein the at least one BSR comprises the LCG ID for the relay data.

3. The method of claim 1, further comprising identifying an uplink data of the relay node to transmit,
   wherein the at least one BSR comprises information informing an amount of the uplink data, and
   wherein the uplink data is related to a group of logical channels that is different from the group of logical channels identified by the LCG ID.

4. The method of claim 3, wherein the at least one BSR comprises a LCG ID of the group of logical channels to which the uplink data is related.

5. The method of claim 1, further comprising:
   receiving, from the upper node, a response for the at least one BSR comprising a resource allocation for the relay data; and
   transmitting, to the upper node, the relay data based on the resource allocation.

6. The method of claim 1, wherein the relay node is a first user equipment (UE), and the lower node is a second UE communicating with the first UE via sidelink.

7. The method of claim 6, wherein the upper node is a base station.

8. The method of claim 6, wherein the upper node is a third UE.

9. The method of claim 6, wherein the at least one BSR comprises a sidelink BSR, and
   wherein the sidelink BSR comprises a group index informing a proximity service (ProSe) destination, the LCG ID, and an amount of data in the group of logical channels identified by the LCG ID.

10. The method of claim 9, wherein the group index is dedicated to informing that the amount of data in the group of logical channels is related to the amount of the relay data.

11. The method of claim 9, wherein all triggered sidelink BSRs related to the relay data from a ProSe source are cancelled after the sidelink BSR related to the relay data from the ProSe source is included in a media access control (MAC) protocol data unit (PDU) for a transmission.

12. The method of claim 9, wherein all triggered sidelink BSRs related to the relay data for the ProSe destination is cancelled after the sidelink BSR related to the relay data for the ProSe destination is included in a media access control (MAC) protocol data unit (PDU) for a transmission.

13. The method of claim 9, wherein all triggered sidelink BSRs related to the relay data from a ProSe source for the ProSe destination are cancelled after the sidelink BSR related to the relay data from the ProSe source for the ProSe destination is included in a media access control (MAC) protocol data unit (PDU) for a transmission.

14. A relay node in a wireless communication system, the relay node comprising:
   a memory;
   a transceiver; and
   at least one processor, operatively coupled to the memory and the transceiver, configured to:
   identify relay data that is received from a lower node and to be forwarded to an upper node, and
   control the transceiver to transmit, to the upper node, at least one buffer status report (BSR) comprising information informing an amount of the relay data mapped to a logical channel group (LCG) identifier (ID) for the relay data,
   wherein the LCG ID for the relay data is dedicated to informing that a group of logical channels identified by the LCG ID is related to the relay data.

* * * * *